Figure 1:
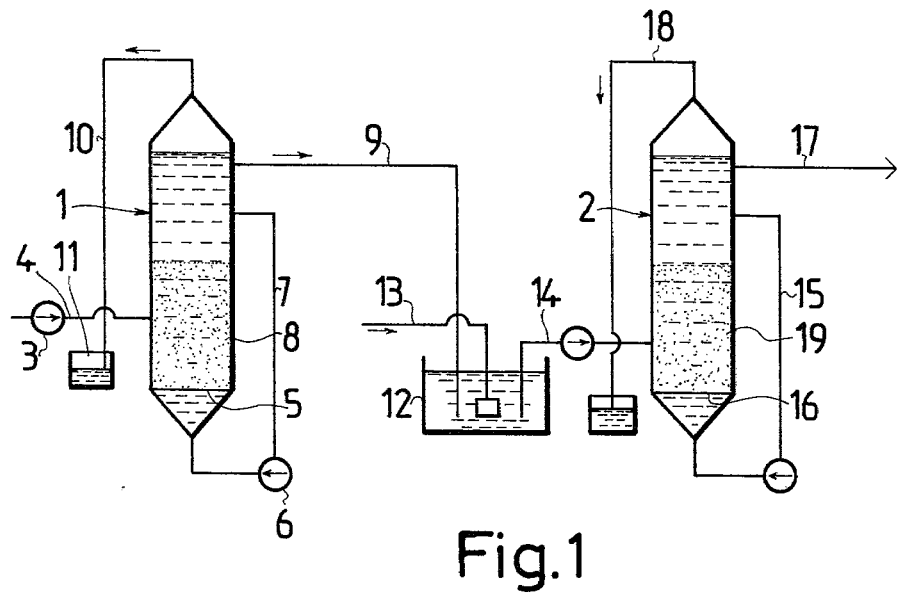

United States Patent [19]

Hakulinen

[11] 4,344,848

[45] Aug. 17, 1982

[54] PROCEDURE FOR PURIFYING WASTE WATER IN A FLOATING LAYER REACTOR

[75] Inventor: Risto R. Hakulinen, Imatra, Finland

[73] Assignee: Enso- Gutzeit Osakeyhtiö, Helsinki, Finland

[21] Appl. No.: 215,407

[22] Filed: Dec. 11, 1980

[30] Foreign Application Priority Data

Dec. 13, 1979 [FI] Finland .................................. 793914

[51] Int. Cl.$^3$ .............................................. C02F 3/08
[52] U.S. Cl. .................................... 210/617; 210/611; 210/909; 210/928
[58] Field of Search ........................ 210/603, 616–618, 210/605, 630, 909, 612, 611, 610, 928

[56] References Cited

U.S. PATENT DOCUMENTS

| 4,169,049 | 9/1979 | Salkinoja-Salone | 210/909 |
| 4,182,675 | 1/1980 | Jeris | 210/618 |
| 4,284,508 | 8/1981 | Jewell | 210/617 |

FOREIGN PATENT DOCUMENTS

| 54-98045 | 8/1979 | Japan | 210/617 |
| 2054549 | 2/1981 | United Kingdom | 210/617 |

Primary Examiner—Benoit Castel
Attorney, Agent, or Firm—Toren, McGeady & Stanger

[57] ABSTRACT

The invention disclosed concerns a procedure for purifying waste wter containing chlorinated phenolic compounds, such as the bleaching effluent of a sulphate cellulose pulp mill. The purification is carried out biologically in a floating bed reactor which has been inoculated with a bacterial population decomposing chlorinated phenolic compounds and wherein the bacteria use the floating particles for affixing substrate. The purification takes place in the reactor under anaerobic conditions, and the water removed from the reactor may be oxygenated or aerated and conducted to a supplementary aerobic purifying step, where another floating bed reactor or a bark filter is used.

11 Claims, 2 Drawing Figures

PROCEDURE FOR PURIFYING WASTE WATER IN A FLOATING LAYER REACTOR

The present invention concerns a procedure for purifying waste water in a floating layer reactor, in said procedure the waste water to be purified being introduced in the lower part of the reactor volume containing solid particles in such manner that the particles float in the waste water flow ascending upward from below.

Purification of waste water in an ascending flow with the aid of a floating layer of particles is a commonly known procedure. The floating particles usually consist of activated carbon, which adsorbs impurities which are present in the water. In the present invention the floating layer is utilized in a purifying process substantially based on bacterial activity and intended to serve the treatment of waste water containing chlorinated phenolic compounds, in particular of waste water from bleaching processes. The invention is characterized in that the floating layer reactor is inoculated with a bacterial population characterized by the ability to decompose chlorinated phenolic compounds and using the floating particles as its attachment substrate; further, that anerobic conditions are maintained in the reactor, and that into the reactor is conducted waste water containing chlorinated phenolic compounds, whereby the waste water will be purified by action of the bacterial population.

Through the Finnish patent application No. 772069 a procedure is known in the art wherein waste water containing chlorinated phenols is treated in a biofilter filled with tree bark. The purification is based on the bacterial population living in the bark course and which has the characteristic ability to tolerate the presence of chlorinated phenols and which may contain bacterial strains which are able to utilize tri- or tetrachlorophenols as their sole carbon sources. This invention is based on the observation that it is possible to inoculate the floating layer reactor with a bacterial population of this kind so that the bacteria become affixed to the surfaces of the floating particles. Thus what is concerned in the procedure of the invention is not a conventional adsorption of impurities to the floating particles: it is essential that the purification is based on the decomposing action of the bacterial population and that the particles merely serve as affixing substrates for the bacteria. It has already been found in experiments that by this procedure purifying results are obtained which are up to ten times better than those achieved with the prior procedure employing a bark filter.

The material of the floating particles employed in the procedure of the invention may vary within wide limits. The following, for instance, may be contemplated in addition to the activated carbon known in the art: ion exchange resins, anion resin in particular, plastics, sand, clay, mud, etc. The particular advantage with anionic resin is that negatively charged bacteria are efficiently bound on the surface of the positive resin particles. The use of activated carbon, again, yields the result that on the side of the decomposing activity in which the bacteria engage, the particles will in conventional manner adsorb impurities which are present in the water.

An advantageous embodiment of the invention is characterized in that in the reactor an internal circulation of the waste water to be purified is applied. The specific aim with such circulation is that the circulation flow maintains in the reactor volume a floating layer of appropriate height independent of the rate at which new, untreated waste water is introduced into the reactor.

Another embodiment of the invention is characterized in that the bacterial population with which the reactor is inoculated comprises at least one strain of bacteria growing in trichlorophenol and at least one strain of bacteria growing in tetrachlorophenol and which belong to the strains deposited at the laboratory of microbiology of the University of Helsinki under the deposition codes YM 241-268. The bacterial population may then consist mainly of strains of bacteria deposited in said institute with the deposition codes YM 134-202 and YM 241-268, which are in themselves known in the art through the earlier Finnish patent application No. 772069 cited above. When using a bacterial population of this kind, the procedure is particularly appropriate for treatment of bleaching effluent containing ample amounts of various chlorinated and non-chlorinated phenols. On the other hand, other kinds of waste water may also be treated by the procedure—for instance waste water containing TCDD, or 2,3,7,8-tetrachlorodibenzoparadioxine. TCDD is a substance which is produced e.g. on heating certain polychlorinated phenols.

Since the decomposition of chlorinated phenols requires anaerobic conditions, it is proper to supplement the purifying process suggested here by an aerobic purifying step serving the aim to lower the BOD value of the water. This may be accomplished in that the water removed from the floating layer reactor is oxygenated or aerated and thereafter conducted into another reactor, which may be either a floating layer reactor or a bark filter.

Figure 2:
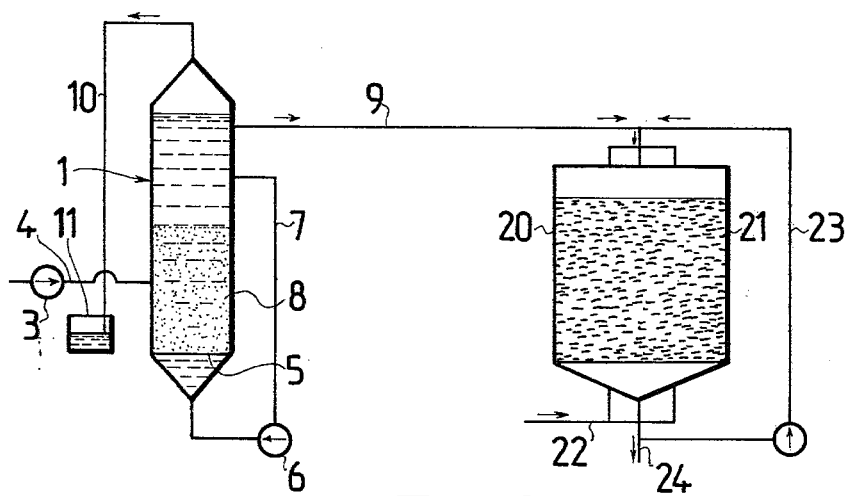

The invention is clarified in greater detail in the following with reference, to begin with, to the attached drawing, wherein FIGS. 1 and 2 present two different apparatus assemblies for use in applying the procedure of the invention, and by thereafter describing the procedure by the aid of certain exemplary cases.

In FIG. 1 has been depicted an apparatus assembly specifically intended for use in purifying the bleaching effluent of a sulphate cellulose pulp mill and comprising two floating layer reactors, 1 and 2. In the first reactor 1 takes place the anaerobic purifying step, in which the chlorinated phenols contained in the effluent are decomposed under bacterial effect, and in the second reactor 2 is performed aerobic purification, which aims to reduce the BOD value of the water. The effluent to be treated is supplied by means of a pump 3 by the input conduit 4 into the reactor 1, at a level slightly above the perforated plate 5 found in the lower part of the reactor. To the reactor 1 has been connected a circulation conduit 7 provided with pump 6, and through which the water to be treated is transported from the upper part of the reactor to its lower part, under the perforated plate 5. The floating layer 8 in the reactor volume consists of minute anionic resin particles, and the intensity of the circulating flow through the conduit 7 has been so adjusted in the case depicted in the figure that the height of the floating layer will be approximately one half of the reactor volume height. The conduit 9 for draining the anaerobically treated water starts at a point close to the top of the reactor 1, and the gas accumulating in the top part of the reactor is voided by the conduit 10 into the vessel 11. The drain conduit 9 terminates in an aerating tank 12, which may be pressurized and wherein air or pure oxygen is introduced through the conduit 13 into the anaerobically treated water. From the aerating tank 12, the water is carried by the conduit 14 to the aerobic floating layer reactor 2, which is fully consistent with the reactor 1 as to its construction. Thus, it comprises a circulation conduit 15, a perforated plate 16, and conduits 17 and 18 for purified water and escaping gases, and the reactor volume contains a floating layer 19 consisting of anionic resin particles, this layer being maintained with the aid of the circulation flow.

The purifying apparatus depicted in FIG. 2 differs from that of FIG. 1 in that it comprises for the second, aerobic purifying step, a bark filter 20. The anaerobically treated water goes, in the case depicted, from the floating layer reactor 1 by the conduit 9 to the bark filter 20 without passing through any aerating vessel in between. The bark filter 20 comprises a layer 21 of coniferous tree bark mincings, where the water flows downward from the top, and into the lower part of the filter is simultaneously through the conduit 22 introduced air, which creates aerobic conditions within the filter. The bark filter 20 is furthermore provided with a conduit 23 for circulation of the water to be treated and with a conduit 24, through which the purified water is withdrawn from the apparatus.

EXAMPLE 1

The apparatus of the drawing was used to treat an effluent mixture containing 50% bleaching effluent from the chlorinating step of a sulphate cellulose pulp mill and 50% bleaching effluent from the alkaline step of the sulphate cellulose pulp mill. Both floating layer reactors had a capacity of 7 liters, and both contained 1 liter of anionic resin particles, which had by the aid of circulation been lifted to constitute a stationary floating layer filling about one half of the reactor's volume. The anaerobic reactor was inoculated with a bacterial population decomposing chlorinated phenols, this population having been established by treating in the laboratory, in the manner disclosed in the Finnish patent application No. 772069, a bacteriferous sample taken from a water body adjacent to the bleaching plant of the sulphate cellulose pulp mill. The pH in the reactor volume during the process was 6-7 and the temperature, +25° C., and the oxygen concentration was in the range of 0 to 0.5 mg/l. The results of purification with various hydraulic loadings (water quantity treated during a given period divided by the volume of the anaerobic reactor) are reported in the attached Table.

The vertical columns I state the contents of chlorinated phenols (in mg/m$^3$) in the effluent prior to the purifying treatment; the vertical columns II give the respective contents subsequent to purification and, following thereafter, the elimination percentage in each case. The results reveal that the purifying effect is somewhat impaired with increasing hydraulic loading, but with loading amounting to 23 m$^3$ per m$^3$×day, the total elimination was still as high as 78.9%. The trials further revealed that the process removes from the effluent, on the side of chlorinated phenolic compounds, also high-molecular organic compounds with a molecular weight which may be even as high as 6500.

EXAMPLE 2

The anaerobic floating layer reactor of Example 1 was inoculated with a bacterial population decomposing chlorinated phenolic compounds, established in accordance with the teachings of the Finnish patent application No. 772069. The floating particles consisted of mud introduced into the ractor together with the bacteria. In this reactor was treated water containing 2,3,7,8-tetrachlorodibenzoparadioxine, or TCDD, by circulating the water in the reactor for ten days. No water was added to the reactor during this time. The initial TCDD concentration was 250 mg/m$^3$, and on conclusion of the treatment period the concentration was observed to have gone down about 60%.

It is obvious to a person skilled in the art that different embodiments of the invention are not restricted to the exemplary cases presented here, and that they may vary within the scope of the claims following below. For instance, the construction of the apparatus used may differ from that shown in the drawing, and it is for instance possible to omit the perforated plates disposed at the lower ends of the reactors. Moreover, members for blowing in extra air may be connected to the aerobic floating layer reactor or to the circulating conduit belonging thereto, and similarly when a bark filter is used in the aerobic purifying step, the anaerobically treated water may be conducted into a separate aerating tank like that shown in FIG. 1, prior to its introduction into the filter.

TABLE

| | Loading, m$^3$/m$^3$ · day mg/m$^3$ | | | | | | | | | | | | | | |
|---|---|---|---|---|---|---|---|---|---|---|---|---|---|---|---|
| | 3 × | | | 6 × | | | 9 × | | | 12 × | | | 23 × | | |
| COMPOUND | I | II | % | I | II | % | I | II | % | I | II | % | I | II | % |
| 2,4-dichlorophenol | 12,8 | — | 100 | — | — | — | — | — | — | — | — | — | — | — | — |
| 2,4,6-trichlorophenol | 138 | — | 100 | 138 | 1,8 | 98,6 | 25,3 | 4,6 | 81,8 | 63,0 | 5,3 | 91,5 | 110 | 19,1 | 82,6 |
| 2,3,6-trichlorophenol | 19,4 | 20,2 | 0 | 23,5 | 20,3 | — | — | — | — | — | — | — | 6,3 | — | 100 |
| 2,4,5-trichlorophenol | 70,0 | 1,4 | 80,0 | 6,5 | — | 100 | 2,6 | 1,7 | 34,6 | — | — | — | — | — | — |
| 3,5-dichloro-2,6-dimethoxyphenol | — | — | — | 14,4 | — | 100 | — | — | — | 4,1 | 3,7 | 9,7 | — | — | — |
| 4,5-dichloroguajacol | 334 | — | 100 | 178 | — | 100 | 129 | 66 | 48,8 | — | — | — | 26,6 | — | 100 |
| tetrachlorophenol | 5,6 | — | 100 | 7,3 | — | 100 | 9,7 | 0,8 | 91,7 | 12,6 | 2,0 | 81,1 | 12,0 | 3,6 | 70 |
| trichloroguajacol | 28,2 | — | 100 | 38,6 | 2,3 | 94,0 | 22,7 | 5,5 | 75,7 | 57,2 | 11,7 | 79,5 | 52,7 | 5,8 | 88,9 |
| trichlorocatechol | — | — | — | 1,1 | — | 100 | 3,6 | 0,5 | 86,1 | 1,9 | — | 100 | 0,3 | 0,38 | 0 |
| 3,4,5-trichloro-2,6-dimethoxyphenol | 11,3 | — | 100 | 11,3 | 1,0 | 91,1 | 12,1 | 6,4 | 47,1 | 22,9 | 10,8 | 52,8 | 32,5 | 15,0 | 53,8 |
| tetrachloroguajacol | — | — | — | — | — | — | — | — | — | 66,1 | 4,1 | 93,7 | 27,9 | 6,6 | 76,3 |
| pentachlorophenol | 2,3 | 0,3 | 87,0 | 2,2 | 1,0 | 54,5 | 1,4 | 0,9 | 35,7 | 3,9 | 3,0 | 23,0 | 2,5 | 2,4 | 4 |
| tetrachlorocatechol | 28,0 | 2,4 | 91,4 | 22,5 | 4,7 | 79,1 | 9,8 | — | 100 | 32,6 | 9,9 | 69,9 | 11,9 | 6,8 | 42,8 |
| Total | 567 | 4,1 | 99,2 | 420 | 11,3 | 97,3 | 216 | 86,4 | 60 | 265 | 50,5 | 81,9 | 283 | 59,6 | 78,9 |

I claim:

1. A process for purifying waste water containing chlorinated phenolic compounds comprising passing the waste water upwardly under anaerobic conditions through a bed of particles selected from the group consisting of anionic resin, clay, mud and activated carbon in a reactor so as to fluidize the bed of particles, said particle bed having affixed thereto a bacterial population comprising at least one strain of bacteria growing in trichlorophenol and at least one strain of bacteria growing in tetrachlorophenol and which belong to the bacterial strains deposited at the institute of microbiology of the University of Helsinki with the deposition codes YM 241-268 or YM 134-202, said bacterial population being capable of decomposing chlorinated phenolic compounds, the rate of flow of the waste water being adjusted to allow for decomposition of said chlorinated phenolic compounds, and removing the waste water from the reactor.

2. The process of claim 1 wherein the particles consist of an anionic resin.

3. The process of claim 1 wherein the particles consist of clay or mud.

4. The process of claim 1 wherein the particles consist of activated carbon.

5. The process of claim 1 wherein the reactor is provided with an internal circulation of the waste water to be purified.

6. A process of claim 1 wherein the bacterial population is mainly composed of strains of bacteria deposited at the institute of microbiology of the University of Helsinki with the deposition code YM 241-268.

7. The process of claim 1 wherein the waste water consists of bleaching effluent.

8. A process of claim 1 wherein the waste water is of an effluent containing 2,3,7,8-tetrachlorodibenzoparadioxine.

9. A process of claim 1 wherein the water removed from the fluidized bed is oxygenated or aerated and thereafter conducted into a second reactor for lowering the BOD value of the water.

10. A process of claim 9 wherein said second reactor is a fluidized bed reactor.

11. A process of claim 9 wherein said second reactor contains a bark filter.

* * * * *